W. S. PLUMMER.
TRACTION WHEEL.
APPLICATION FILED SEPT. 29, 1910.
1,003,500.
Patented Sept. 19, 1911.
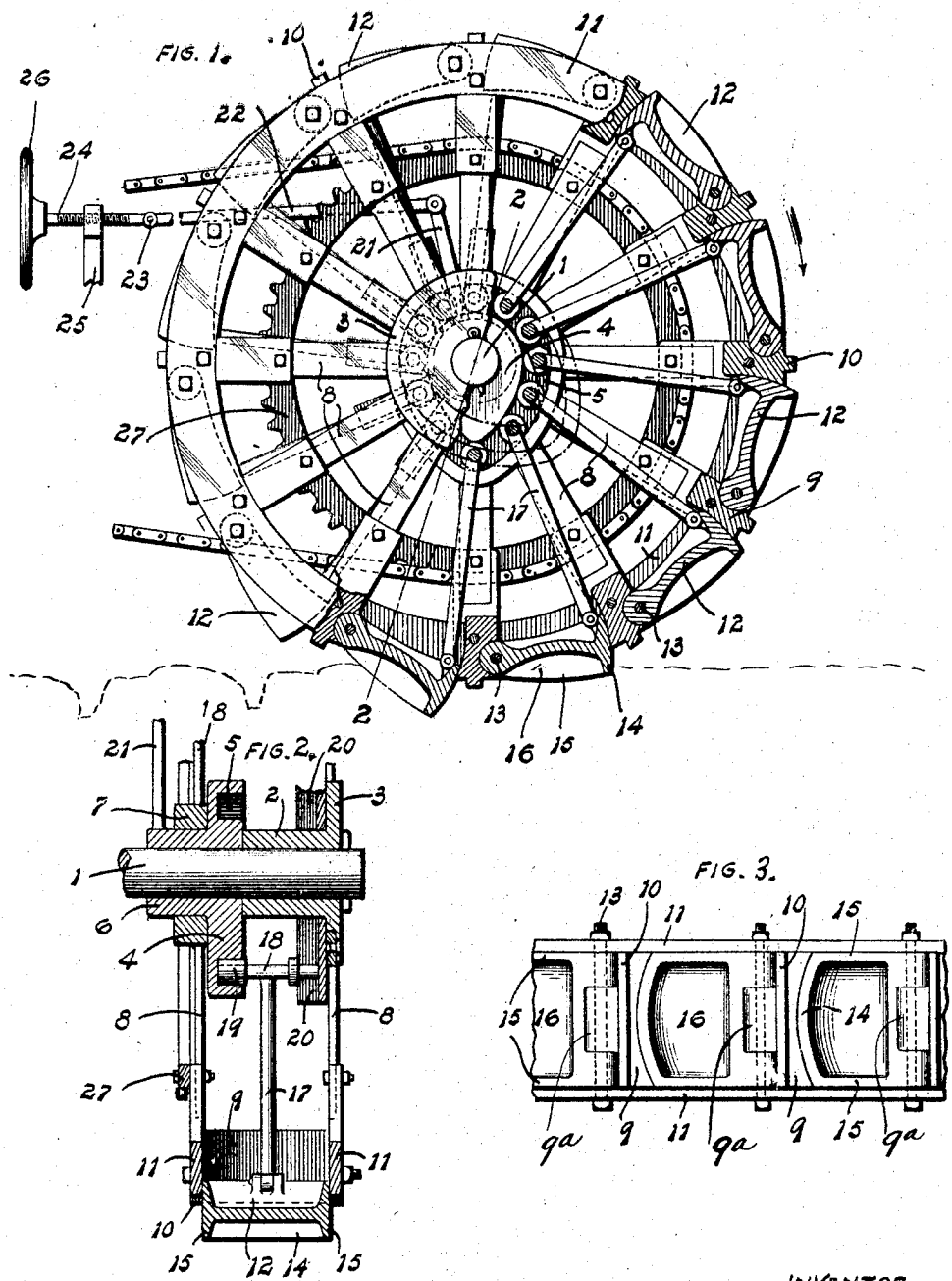
WITNESSES
INVENTOR
WILLIAM S. PLUMMER
BY
ATT'Y.

UNITED STATES PATENT OFFICE.

WILLIAM S. PLUMMER, OF ST. LOUIS, MISSOURI.

TRACTION-WHEEL.

1,003,500. Specification of Letters Patent. Patented Sept. 19, 1911.

Application filed September 29, 1910. Serial No. 584,553.

*To all whom it may concern:*

Be it known that I, WILLIAM S. PLUMMER, a citizen of the United States, residing at St. Louis, Missouri, have invented a certain new and useful Improvement in Traction-Wheels, of which the following is a full, clear, and exact description, such as will enable others skilled in the art to which it appertains to make and use the same, reference being had to the accompanying drawings, forming part of this specification, in which—

Figure 1 is a side elevation of a traction wheel of my improved construction, parts thereof being in section for the purpose of a clear illustration. Fig. 2 is a vertical section taken approximately on the line 2—2 of Fig. 1 with the axle or spindle, and a portion of the hub thereon shown in elevation. Fig. 3 is a plan view of a portion of the rim or periphery of a wheel of my improved construction.

My invention relates to a traction wheel particularly intended for heavy vehicles and transportable machines, such as traction engines, threshing machines, plowing machines and grain sowing machines.

The object of my invention is to produce a comparatively light, strong and durable wheel having a rim or periphery so formed as to materially increase the tractive effect between the periphery of the wheel and the surface of the ground during the operation of the wheel and further to provide a wheel which, when in service, will not slip or skid while traveling over a soft or yielding surface.

A further object of my invention is to construct a wheel having a periphery made up of a series of movable sections, each of which is hinged at one end so as to be swung outwardly and inwardly by means arranged within the wheel and extending radially from the hub thereof.

To the above purposes my invention consists in certain novel features of construction and arrangement of parts hereinafter more fully described and claimed.

Referring by numerals to the accompanying drawing 1 designates an axle or spindle and mounted thereupon is a hub 2 provided with a disk 3. Loosely mounted on the axle or spindle immediately adjacent the hub is a disk 4 in which is formed an eccentric cam groove 5, and formed on or fixed to this disk is a sleeve 6 which embraces the spindle 1. Arranged to rotate freely upon the sleeve 6 is a ring 7 and projecting radially from this ring, and from the disk 3 is a series of spokes 8, arranged in pairs. The outer ends of the pairs of spokes 8 are united by means of transversely disposed cross bars 9 and formed on or fixed to the outer faces of said cross bars are transversely disposed ribs 10. Formed on or fixed to the sides of the bars 9 are circular rims or side plates 11, the outer edges of which lie flush with the outer faces of said bars. The spaces between the circular side plates 11 and the cross bars 9 are occupied by movable sections 12, each of which is hinged at its rear end to a part 9ª of the corresponding cross bar 9 by means of a pin or bolt 13. Each section fits snugly in the space between the circular rims or side plates and a pair of the cross bars 9, and all dirt, gravel and the like is prevented from passing through the periphery of the wheel, by reason of the perfect working fit of the moving sections.

Formed on the outer face of each hinged section, and at the forward end thereof is an outwardly projecting rib 14 and formed on the side edges of each section are outwardly projecting ribs 15. The face of each section between the ribs 14 and 15 is preferably made concave, thus forming a shallow recess or pocket 16.

Pivotally connected to the inner face and forward end of each hinged section is the outer end of a rod 17 the inner end of which is provided with a cross piece 18, one end thereof carrying an anti-friction roller 19, which traverses the groove 5 formed in the disk 4. The opposite end of each cross piece is arranged to slide in a channel-shaped guide way 20 carried by the inner end of the corresponding one of the outer series of spokes 8 and the disk 3.

Formed on or fixed to the sleeve 6 is an arm 21 to the upper end of which is pivotally connected one end of a rod 22 and the opposite end of this rod is connected by means of a knuckle joint 23 to a screw threaded rod 24. This rod 24 operates through a fixed bearing 25 and is provided with an operating handle 26.

The mechanism just described provides means for shifting the position of the disk 4, the eccentric groove in which controls the outward and inward movements of the hinged sections. When it is desired to transmit rotary motion from the traction wheel, a sprocket wheel 27 is fixed to one side of the frame of the wheel.

When a vehicle or machine equipped with wheels of my improved construction is traversing ground which is comparatively soft and yielding the hand wheel 26 is manipulated to shift the position of the disk 4, so that the eccentric portion of the groove 5 therein is at a point immediately beneath the axle or spindle. As the wheel moves forward the rollers 19 will successively pass from the concentric portion of the groove 5 into and through the eccentric portion thereof, and as a result the radially arranged rods 17 will be successively moved outward, thereby swinging the sections 12 upon their hinges, and causing the forward ends of said sections to engage in the ground. As these sections are swung upon their hinges their forward ends are moved outward away from the normal periphery of the wheel, and as said sections engage the ground a small portion of earth is compressed in the form of a low mound, in the pocket of each section, and the ribs 14 and 15 in front of and at the sides of the compressed mound engage the earth in such a manner as to effectually prevent rotary and lateral slipping of the wheel. After the hinged sections thus engage the ground and the wheel moves forward said sections are successively drawn into their normal positions between the circular side plates or rims, by reason of the rollers 19 traveling into the concentric portion of the groove 5. When the wheel is traversing hard ground or pavement, the disk 4 is shifted into the position shown by dotted lines in Fig. 1, and thus the sections move outward and then inward to normal positions, before coming in contact with the ground.

It will be readily understood that the disk 4 can be adjusted so as to cause the forward ends of the hinged sections to swing to their outer limit of movement either in front of or behind a vertical line drawn through the axis of the wheel.

It will be noted that in my improved wheel, the entire periphery or rim is made up of a series of hinged sections and cross bars 9, and while the wheel is in service the engagement of the hinged sections with the ground materially increases the tractive effect of the wheel upon the ground and effectually prevents the wheel from slipping or skidding.

I claim:

1. In a traction wheel of the class described, a hinged member forming a portion of the tread of the wheel, the outer face of which member is concave, which member is hinged at one end to the rim of the wheel, and means for swinging said member upon its hinge to partially move its free end away from and toward the periphery of the wheel at predetermined periods during the rotation of said wheel.

2. In a traction wheel of the class described, a segmental member hinged at one end and forming a portion of the tread of the wheel, a transverse rib formed on the outer face of said member on the end opposite the hinged end, and means within the wheel for positively moving the free end of said segmental member away from and toward the periphery of the wheel at predetermined points in the rotation of said wheel.

3. A traction wheel having a rim comprising a pair of circular plates, cross bars between said plates, a segmental member hinged at one end to each cross bar, the outer faces of all of the segmental members being concave, and means within the wheel for successively moving each segmental member outward and then inward relative to the periphery of the wheel at a predetermined period during the rotation of said wheel.

4. In a traction wheel, a rim comprising a pair of side plates, cross bars fixed to the side plates, lugs on said cross bars, pins seated in said lugs and cross bars, movable sections hinged to said pins, which sections occupy the openings between the side plates and the cross bars, and means for successively swinging each segmental member upon its hinge outwardly and then inwardly relative to the periphery of the wheel.

5. In a traction wheel, a rim comprising a pair of side plates, cross bars fixed to the side plates, lugs on said cross bars, pins seated in said lugs and cross bars, movable sections hinged to said pins, which sections occupy the openings between the side plates and the cross bars, means for successively swinging each segmental member upon its hinge outwardly and then inwardly relative to the periphery of the wheel and an adjustable member connected to a portion of the segmental member moving means for changing the position thereof.

In testimony whereof I hereunto affix my signature in the presence of two witnesses, this 23d day of September, 1910.

WILLIAM S. PLUMMER.

Witnesses:
M. P. SMITH,
J. W. CLIFT.